US007450552B2

(12) United States Patent  
Behroozi

(10) Patent No.: US 7,450,552 B2  
(45) Date of Patent: Nov. 11, 2008

(54) ACCESS POINT CONTROL OF CLIENT ROAMING

(75) Inventor: Cyrus Behroozi, Menlo Park, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 637 days.

(21) Appl. No.: 10/884,484

(22) Filed: Jul. 2, 2004

(65) Prior Publication Data

US 2006/0002350 A1    Jan. 5, 2006

(51) Int. Cl.  
*H04Q 7/24* (2006.01)

(52) U.S. Cl. .................. 370/338; 370/346; 370/348; 455/426.1; 455/426.2; 455/434; 455/435.1

(58) Field of Classification Search ............... 370/338, 370/346, 348; 455/422.1, 426.1, 426.2, 434, 455/435.1  
See application file for complete search history.

(56) References Cited

U.S. PATENT DOCUMENTS

| | | | | |
|---|---|---|---|---|
| 5,203,013 A * | 4/1993 | Breeden et al. | ............. | 455/434 |
| 6,473,413 B1 | 10/2002 | Chiou et al. | | |
| 6,701,361 B1 * | 3/2004 | Meier | .................. | 709/224 |
| 6,744,753 B2 | 6/2004 | Heinonen et al. | | |
| 7,002,932 B1 * | 2/2006 | Young et al. | ............... | 370/312 |
| 7,058,030 B2 * | 6/2006 | Ekl et al. | .................... | 370/328 |
| 2004/0087331 A1 * | 5/2004 | Hwang et al. | ............... | 455/522 |
| 2004/0125820 A1 * | 7/2004 | Rios | ......................... | 370/480 |
| 2005/0060319 A1 * | 3/2005 | Douglas et al. | .............. | 707/10 |
| 2005/0063419 A1 * | 3/2005 | Schrader et al. | ............. | 370/466 |
| 2005/0135316 A1 * | 6/2005 | Cromer et al. | .............. | 370/338 |
| 2005/0143073 A1 * | 6/2005 | Lee et al. | .................... | 455/436 |
| 2005/0256937 A1 * | 11/2005 | Lewis | ......................... | 709/217 |
| 2006/0041931 A1 * | 2/2006 | Boxall et al. | .................. | 726/4 |
| 2006/0073827 A1 * | 4/2006 | Vaisanen et al. | ............ | 455/436 |
| 2006/0116170 A1 * | 6/2006 | Brahmbhatt et al. | ........ | 455/560 |
| 2006/0227731 A1 * | 10/2006 | Shun et al. | ................... | 370/310 |
| 2006/0234678 A1 * | 10/2006 | Juitt et al. | .................... | 455/411 |
| 2006/0238400 A1 * | 10/2006 | Brennan et al. | ............. | 341/173 |
| 2007/0053362 A1 * | 3/2007 | Garg | ....................... | 370/395.1 |

\* cited by examiner

*Primary Examiner*—Dwayne D Bost  
*Assistant Examiner*—Inder P Mehra  
(74) *Attorney, Agent, or Firm*—Brian R. Short

(57) ABSTRACT

Methods of access point control of client roaming are disclosed. The methods can include the access point periodically transmitting requests to a client, the access point monitoring reception of response to the requests, and the access point transmitting at least one disassociation frame if a response is not received by the access point from the client. An embodiment includes the disassociation frame being suppressed if the access point receives an association response from another access point that is intended for the client. Another embodiment includes the access point transmitting a disassociation frame if a response is received from the client, and a signal quality parameter of the response is below a threshold.

21 Claims, 9 Drawing Sheets

THE ACCESS POINT MONITORING RECEPTION OF SIGNALS FROM A CLIENT WITH WHICH THE ACCESS POINT HAS HAD COMMUNICATION

610

IF THE ACCESS POINT STOPS RECEIVING SIGNALS FROM THE CLIENT, THE ACCESS POINT TRANSMITTING A LINK STATUS INDICATION TO THE CLIENT, INDICATING THAT THE ACCESS POINT IS NOT RECEIVING SIGNALS FROM THE CLIENT

620

THE ACCESS POINT PERIODICALLY TRANSMITTING REQUESTS TO A CLIENT

710

THE ACCESS POINT MONITORING RECEPTION OF RESPONSE TO THE REQUESTS

720

THE ACCESS POINT TRANSMITTING AT LEAST ONE DISASSOCIATION FRAME IF A RESPONSE IS NOT RECEIVED BY THE ACCESS POINT FROM THE CLIENT

ACCESS POINT CONTROL OF CLIENT ROAMING

FIELD OF THE INVENTION

The invention relates generally to communication networks. More particularly, the invention relates to access point control of client roaming.

BACKGROUND OF THE INVENTION

Wireless access devices are becoming more prevalent. Wireless access can be implemented in many different forms, including connecting a wireless access device (client) through a wireless mesh network that provides connection to a wired network. FIG. 1 shows a wireless network that includes a client device 130 that is provided access to the internet 100, through a wireless connection to an access point 110 and through a wired network 105. The wireless connection between the access point 110 and the client 130 can be defined by a downlink connection 140 (in which data traffic flows from the access point 110 to the client 130), and by an uplink connection 150 (in which data traffic flows from the client 130 to the access point 110).

Wireless devices tend to be mobile. That is, the location of the client 130, for example, generally changes over time. An arrow 160 shows a possible direction of motion of the client 130. The motion of the client can greatly influence the quality of the downlink 140 and the uplink 150. For example, the wireless links can suffer from interference, multipath propagation, and signal attenuation. Degradation of the link can be greater for either the downlink 140 or the uplink 150. Therefore, either the downlink 140 or the uplink 150 can be broken during motion of the client 130. Clearly, a broken link is an undesirable condition.

FIG. 1 also shows a second access point 120. As the client 130 moves, the client 130 may become physically located so that the second access point 120 provides better quality links than the first access node 110. The link quality may be better for either the downlink 140 or uplink 150 direction, or both downlink and uplink directions. If the link quality becomes better for the second access point 120, the client 110 should ideally make a seamless transfer to the second access point 120. The client 130 must break communication with the first access node 110, and establish communication with the second access node 120. This can become complicated because the client 130 may not be aware that communication with the first access node 110 has been broken, and that communication with the second access node 120 must be established. That is, the uplink 150 between the client 130 and the first access node 110 may be broken, but the downlink 140 may remain intact, causing the client 130 to be unaware that connection with a new access point is required.

An expeditious transfer from a first access point to a second access point is desirable because it can allow a client to maintain a network connection with minimal interruption. The ability to determine when the second access point provides a better connection to the client can help to ensure that transfers occur such that service to the client is uninterrupted.

It is desirable to have a method and apparatus for wireless networking that provides for proper transfer of a client from a first access point to a more desirable second access point.

SUMMARY OF THE INVENTION

The invention includes a method and apparatus for access node initiated roaming. The method and apparatus allow for decentralized control, and therefore easily allow for network expansion.

An embodiment of the invention includes a method of access point control of client roaming. The method includes the access point monitoring reception of signals from a client with which the access point has had communication. If the access point stops receiving signals from the client, the access point transmits a link status indication to the client, indicating that the access point is not receiving signals from the client.

Another embodiment of the invention includes another method of access point control of client roaming. The method includes the access point periodically transmitting requests to a client, the access point monitoring reception of response to the requests, and the access point transmitting at least one disassociation frame if a response is not received by the access point from the client. An embodiment includes the request being an ARP request, and the response being an ARP response. An embodiment includes the disassociation frame being suppressed if the access point receives an association response from another access point that is intended for the client. Another embodiment includes the access point transmitting a disassociation frame if a response is received from the client, and a signal quality parameter of the response is below a threshold.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 7 is a flow chart showing more specific implementation of the method of FIG. 6.

DETAILED DESCRIPTION

Figure 1:
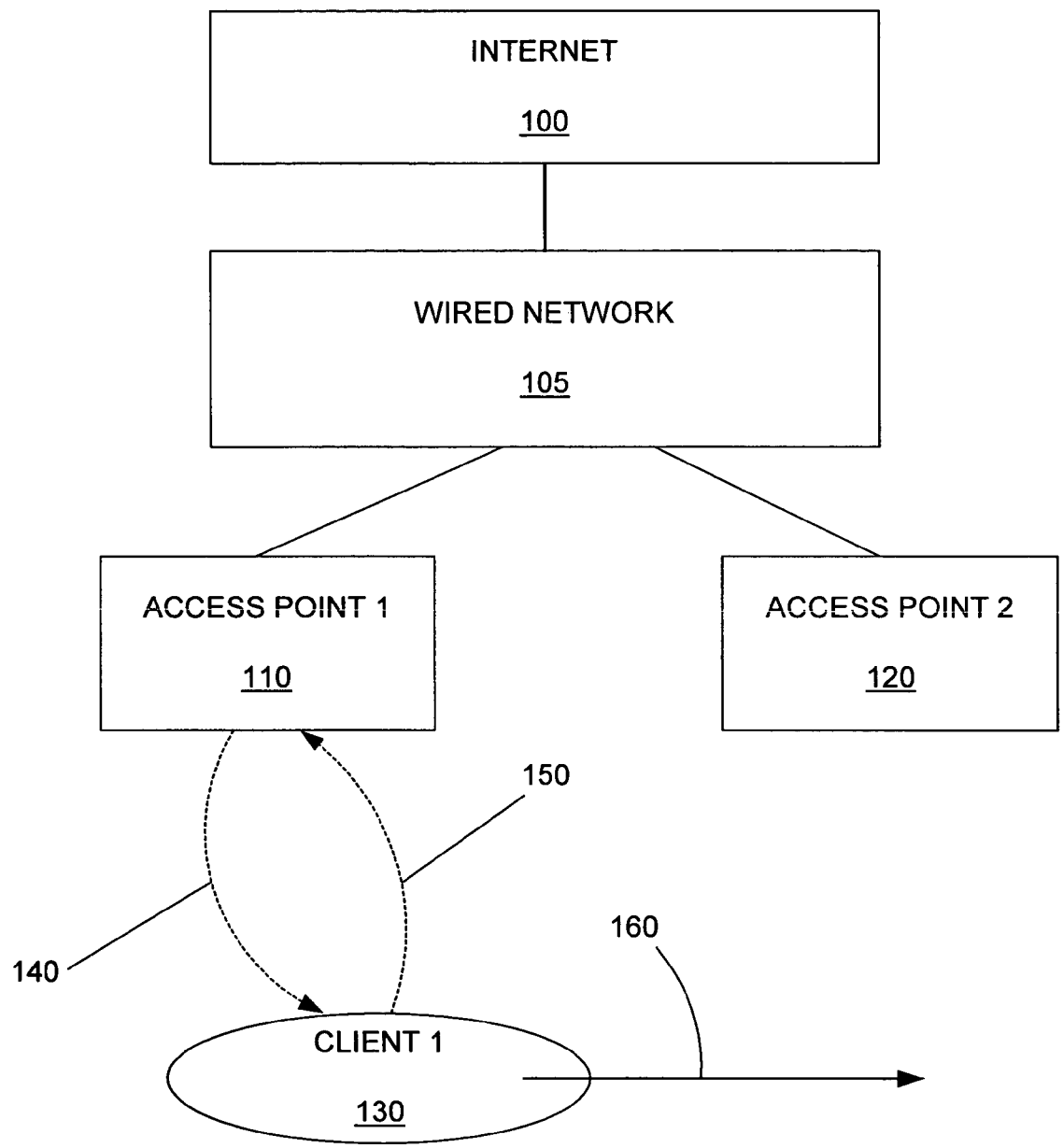
FIG. 1 shows a network device connected to a client through a mesh network.

As shown in the drawings for purposes of illustration, the invention is embodied in methods and apparatus for access node initiated roaming. The method and apparatus allow for decentralized control, and therefore easily allow for network expansion.

Figure 2:
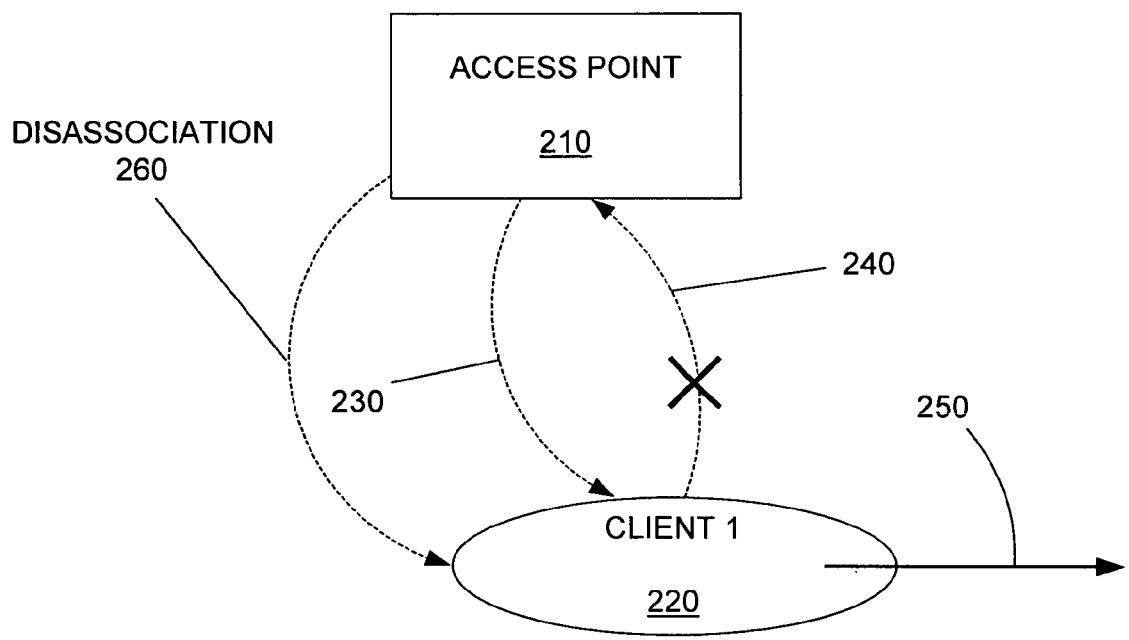
FIG. 2 shows an access point in communication with a client.

FIG. 2 shows an access point 210 in communication with a client 220. The access point communicates with the client through a downlink connection 230, and the client communicates with the access point 210 through an uplink connection 240. If the client is mobile, and has moved, for example as shown by arrow 250, the uplink connection 250 may be broken (as depicted by the cross over the uplink connection 250).

A client can generally be any computing device, such as a laptop, a personal computer, a personal digital assistant (PDA), a cell phone, or a music device. The client preferably can communicate over available transmission channels and operate with communication protocols of the access points.

An access point is generally a device that provides a client with wireless access to a network. Access points can be wired or wirelessly connected to the network.

In 802.11 networks, the decision to transfer (roam) from one access point to another is typically made by the client device. Generally, the clients can accurately measure received signal strength from an access point, providing a measure of the signal strength of signals transmitted over the downlink connection. However, the clients typically do not have any information regarding the signal strength of signals transmitted over the uplink connections. This can be particularly problematic when low-powered clients are deployed for communication with networks that include high-powered access points. In this situation, symmetry of the links is not valid. That is, typically the uplink connection will break before the downlink connection because the signal power of the uplink is different than the signal power of the uplink. Due to the fact that the clients are monitoring the downlink connection (typically the better connection due to the greater transmission signal power of access points), the client may not be aware that an uplink connection to an access point may be broken. The clients can end up in situations in which they are receiving a strong signal from an access point, but are too far away to send data back to the access point. This situation can exist even if the client happens to be in communication range with another access point that could provide working downlink and uplink communication.

Uplink Quality Monitoring

The scenario in which clients are receiving a strong signal from an access point, but are too far away to send data back to the access point can be avoided by the access points monitoring the quality of the uplink connections. If an access point detects that an uplink connection with a client is broken, the access point provides a link status indication to the client that the uplink connection is broken. Such a method can include the access point periodically transmitting requests to a client and the access point monitoring reception of responses to the requests. If the access point does not receive any response to the request, the access point transmits at least one disassociation frame. If a response is missed, it is generally due to a broken uplink. If the access point receives a response from the client, communication with the client continues.

More generally, the process of uplink quality monitoring can include the access point monitoring reception of signals from a client with which the access point has had communication. If the access point stops receiving signals from the client, the access point transmits a link status indication to the client that the access point is not receiving signals from the client.

Alternatively, the access points monitor the quality of the responses from the clients, and provide a link status indication to the client if the quality is below a desired threshold. More generally, the access point transmits the link status indication if signal quality parameters of signals received from the client are below a threshold. The quality can include a quality parameter of the response, such as, SNR, BER, PER or signal strength. The indicator prompts the client to search for a better uplink and/or downlink connection with another access point. The request by the access point can be an ARP request, with the response from the client being an ARP response. ARP requests and responses are practical because these requests are almost universally responded to, making them a reliable protocol for eliciting responses across a wide range of client devices. If the 802.11 protocol is being used, any unicast packet is responded to with an acknowledgment packet.

Intelligent access point selection by a client can be realized by the access points providing timed response to association requests. That is, when a client desires a connection, the client transmits an association request that can be received by access points. If an access point receives the association request, the access point responds to the association request providing an indication to the client that the client can connect to the access point. A quality parameter of the association requests can be monitored by the access points. Depending upon a magnitude of the quality parameter, the access points can time the response to the association request. Therefore, the client can determine which access point received the highest quality association request, and therefore, make an intelligent decision as to which access point to complete a network connection. The quality parameter can include SNR, signal strength, BER or PER. An embodiment includes the time of the response being proportional to the magnitude of the quality parameter. Typically, the client will seek connection with the access point that provides the first response.

Figure 3:
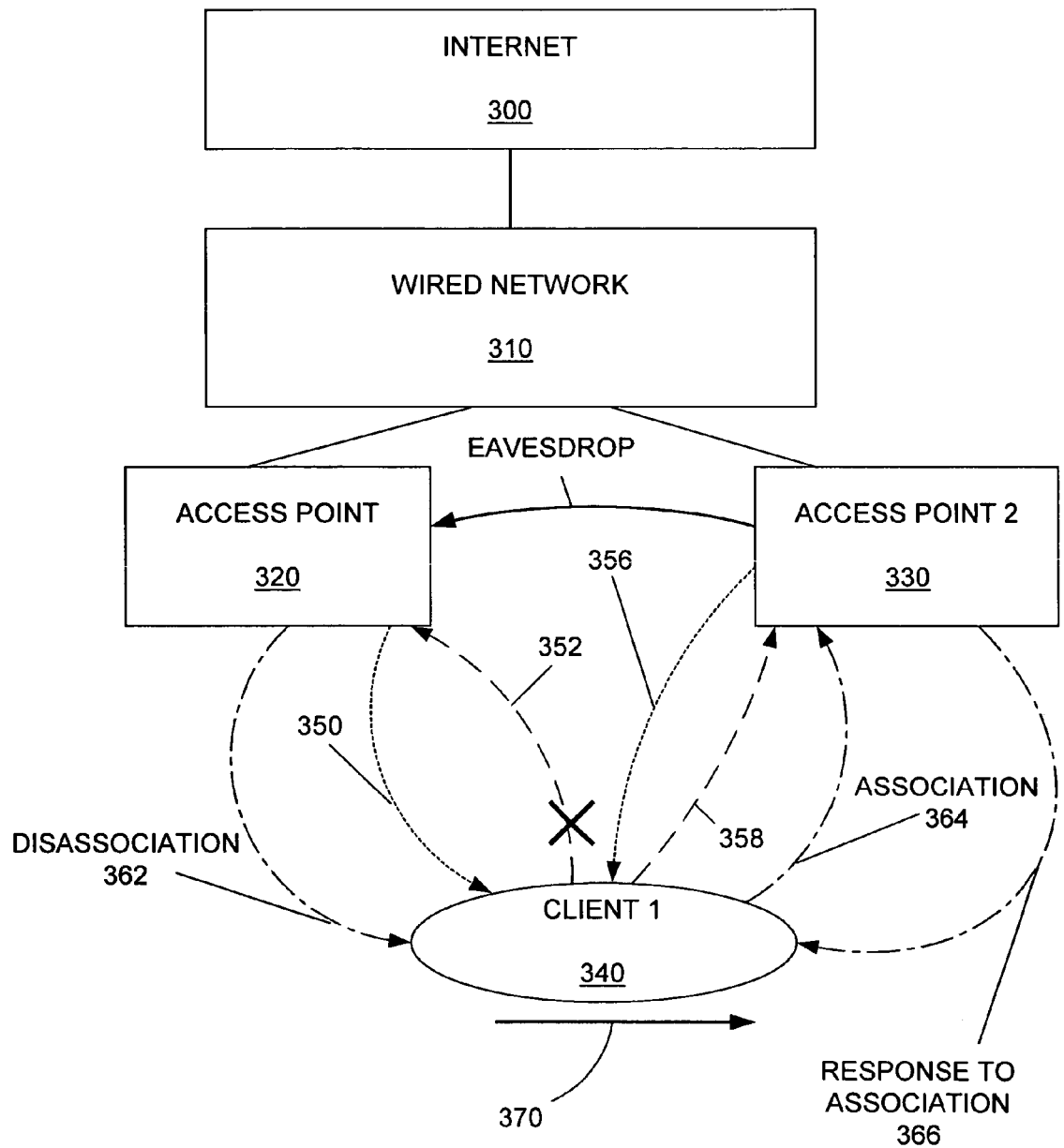
FIG. 3 shows a client in communication with a first access node and a second access node.

FIG. 3 shows a client 340 in communication with a first access point 320 and a second access point 330. The access points 320, 330 are connected to a wired network 310, which is connected, for example, to the internet 300. The first access point 320 and a second access point 330 provide the client 340 access to the network 310.

As shown in FIG. 3, the client 340 initially is communicating with the first access point through a downlink 350 and an uplink 352. The first access point 320 continually probes the client 340 with requests. If the client 340 fails to respond to the requests (due to a broken uplink connection 352), the first access point 320 transmits a disassociation frame to the client (as indicated by the arrow 362). The client 340 then transmits an association request (shown as arrow 364) attempting to locate another access point, such as the second access point 330, through which to reestablish communication with the network 310 if another access point, such as the second access point 330, receives the association request, the access point responds with an association response (as shown by the arrow 366). A downlink 356 and uplink 358 are then established between the client and the new access point.

Suppression of Disruptive Disassociations

In practice, it has been determined that some clients will disassociate even when receiving a disassociation frame from an access node that is no longer in communication with the client. For example, it has been determined that with some clients, such as client 340, that when the client 340 receives a disassociation frame from a first access point, such as access point 320, the client 340 disassociates from whatever access point the client is connected. For example, even after the client 340 has completed its connection with the second access point 330, the client may disassociate from the second access point 330 upon receiving a disassociation frame from the first access point 320.

The disassociation frame of the first access point 320 can be suppressed if the first access point 320 receives (that is, eavesdrops) an association response (such as the response 366) from another access point that is intended for the client 340.

Figure 4:
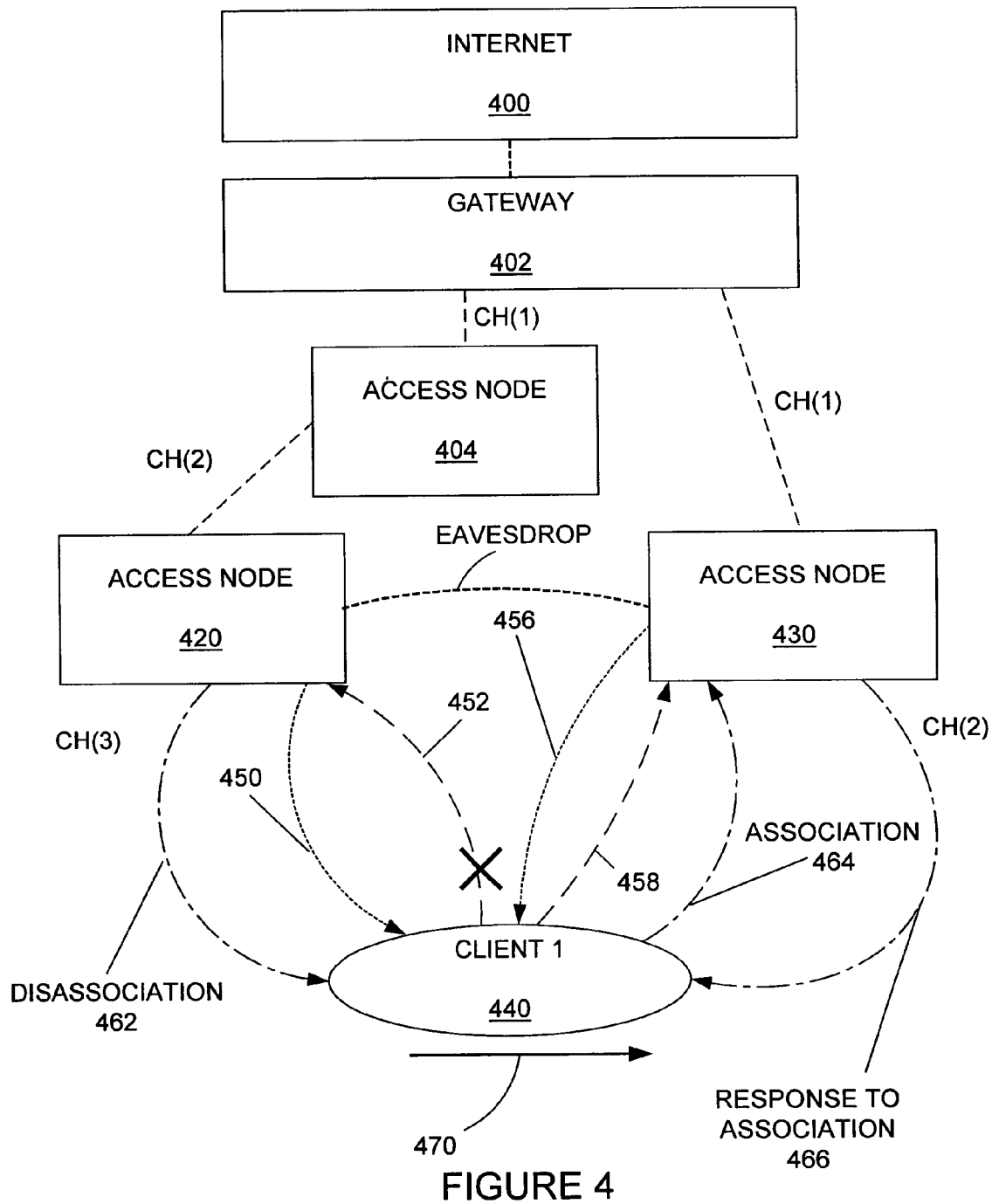
FIG. 4 shows a mesh network that includes a client in communication with a first access node and a second access node.

FIG. 4 shows a mesh network that includes a client 440 in communication with a first access node 420 and a second access node 430. The mesh network includes a gateway 402 that is either wired or wirelessly connected to a network 400. Each access node includes a data path to the gateway 402, and can provide the client 440 with a connection to the network 400.

Access nodes are devices having one or more network interfaces, and are capable of routing data traffic. An access node can provide a client device (such as client 440) with a network connection.

The access nodes 404, 420, 430 within the mesh network are wirelessly connected to the gateway 402. Access nodes 404, 430 that are wirelessly connected directly to the gateway 402 are designated as first order access nodes, and are located one hop away from the gateway 402. The mesh network typically includes second order access nodes (such as access node 420) that are two hops away from the gateway 402. The mesh network can be expanded to include any number of access nodes, which are any number of hops from a gateway 402. Each access node 404, 420, 430 includes a data path to the gateway 402 which can include more than one transmission channel.

The network includes control that is dispersed among the access nodes. That is, centralized control is not required. The gateway 402 of FIG. 4 is an originator of beacons. The gateway 402 can be wired or wirelessly connected to the network 400. The beacons are routing packets that carry information about routing paths. The beacons are transmitted from the gateway 402 for reception by the access nodes. Access nodes that are able to receive the beacons from the gateway 402 can route data to the gateway 402 if the access node selects the gateway 402 over other gateways that also transmit beacons (which can be over the same channel (CH1), or different channels). Generally, the access nodes receive routing beacons, select a routing path, modify the beacons, and retransmit the modified beacons for reception by other downstream access nodes.

The client 440 can be any type of computing device, such as a laptop computer, a personal computer, a PDA or even a cell phone. The only requirement of the client 440 is that the client 440 must be able to communicate over the available transmission channels.

An upstream path is a data path from a device (access node or client) towards a gateway. A downstream path is in the opposite direction as an upstream path.

As shown in FIG. 4, the gateway 402 transmits beacons over a first channel (CH1). Access nodes 404, 430 both receive the beacons over the first channel (CH1). The access nodes 404, 430 are generally referred to as first order access nodes, and are one hop from the gateway 404. The access nodes 404, 430 modify the beacons to include their routing information and the hop count (hop count of one). The routing information provides a data path back to the gateway 404. The modified beacons are retransmitted over a second channel (CH2). The second channel (CH2) can be the same as the first channel (CH1), or another embodiment includes the second channel (CH2) being a different transmission channel.

Second order access node 420 receives the modified beacons over the second channel (CH2). The second layer access node 420 has a hop count of two. The second layer access node 420 again modifies the received beacons to include routing information, and the new hop count (hop count of two). The second layer access node 420 retransmits the modified beacons over a third channel (CH3). The third channel (CH3) can be the same as the second channel (CH2), or another embodiment includes the third channel (CH3) being a different transmission channel.

The network operates by at least one of the access nodes (such as access node 420) monitoring reception of signals from the client 440 (through an uplink 452.) The at least one access node transmits a link status indication to the client 440 if the access node stops receiving signals from the client 440. The quality of the link between the access node and the client can be additionally monitored by the at least one access node transmitting the link status indicator if a signal quality parameter of signals received by the access node from the client is below a threshold, thereby providing the client with the opportunity to seek a better link with another access node. Again, the quality parameter can be SNR, signal strength, PER or BER.

Transmission of the link status indicator can be suppressed if the access node (such as access node 420) receives an association response from another access node (such as access node 430) that is intended for the client 440. The association response must be either communicated between the access nodes through the network, or the association response can be eavesdropped wirelessly by the access node 420. For example, if the client 440 is in communication with the access node 420 but initiates communication (transmits an association request 464) with the access node 430, the access node 420 can receive an association response from the access node 430 by eavesdropping the association response 466 of the access node 430. Another embodiment includes the association response being communicated between the access nodes through the network. Once the access node 420 receives the association response from the other access node 430, the access node 420 suppresses the disassociation frame 462.

Upon receiving the disassociation frame 462 from the access node 420, the client 440 transmits the association request 464. If properly received by the access node 430, the access node 430 responds with the response to association 466, allowing the downlink 456 and the uplink 458 to be formed between the access node 430 and the client 440.

The wireless links between the access nodes and the client can be, for example, consistent with the 802.11 protocol. For this embodiment, at least one of the access nodes (the access node most recently in communication with the client, such as access node 420) periodically transmits requests to the client 440. The access node 420 monitors reception of response to the requests. The access node 420 transmits at least one disassociation frame 462 if a response is not received by the access node 420 from the client 440. The request can be an ARP request, and the response can be an ARP response. As previously described, the disassociation frame 462 can be suppressed if the access node 420 receives an association response 466 from another access node 430 that is intended for the client 440.

Alternatively, the access nodes monitor a quality of the response from the clients, and provide a link status indication to the client if the quality is below a desired threshold. More generally, the access node transmits the link status indication if signal quality parameters of signals received from the client are below a threshold. The quality can include a quality parameter of the response, such as, SNR, BER, PER or signal strength. The indicator prompts the client to search for a better uplink and/or downlink connection with another access node. The request by the access node can be an ARP request, and the response for the client being an ARP response. ARP requests are practical because these requests are almost universally responded to, making them a reliable protocol for eliciting responses across a wide range of client devices. If the 802.11 protocol is being used, any unicast packet is responded to with an acknowledgment packet. A typical 802.11 client responds to received disassociation frames by transmitting a new association request in an attempt to locate a new access node for connection with the network.

Within the 802.11 protocol, a client transmits an association request when attempting to connect to the network. Intelligent access node selection by a client can be realized by the access nodes providing timed response to association requests. That is, when a client desires a connection, the client transmits an association request that can be received by access nodes. If an access node receives the association request, the access nodes provide a response to the association request providing an link status indication to the client that the client can connect to the access node. A quality parameter of the association requests can be monitored by the access nodes. Depending upon a magnitude of the quality parameter, the access nodes can time the response to the association request. Therefore, the client can determine which access node received the highest quality association request, and therefore, make an intelligent decision as to which access node to complete a network connection. The quality parameter can include SNR, signal strength, BER or PER. An embodiment includes the time delay of the response being proportional to the magnitude of the quality parameter. Typically, the client will seek connection with the access node that provides the first response.

Figure 5:
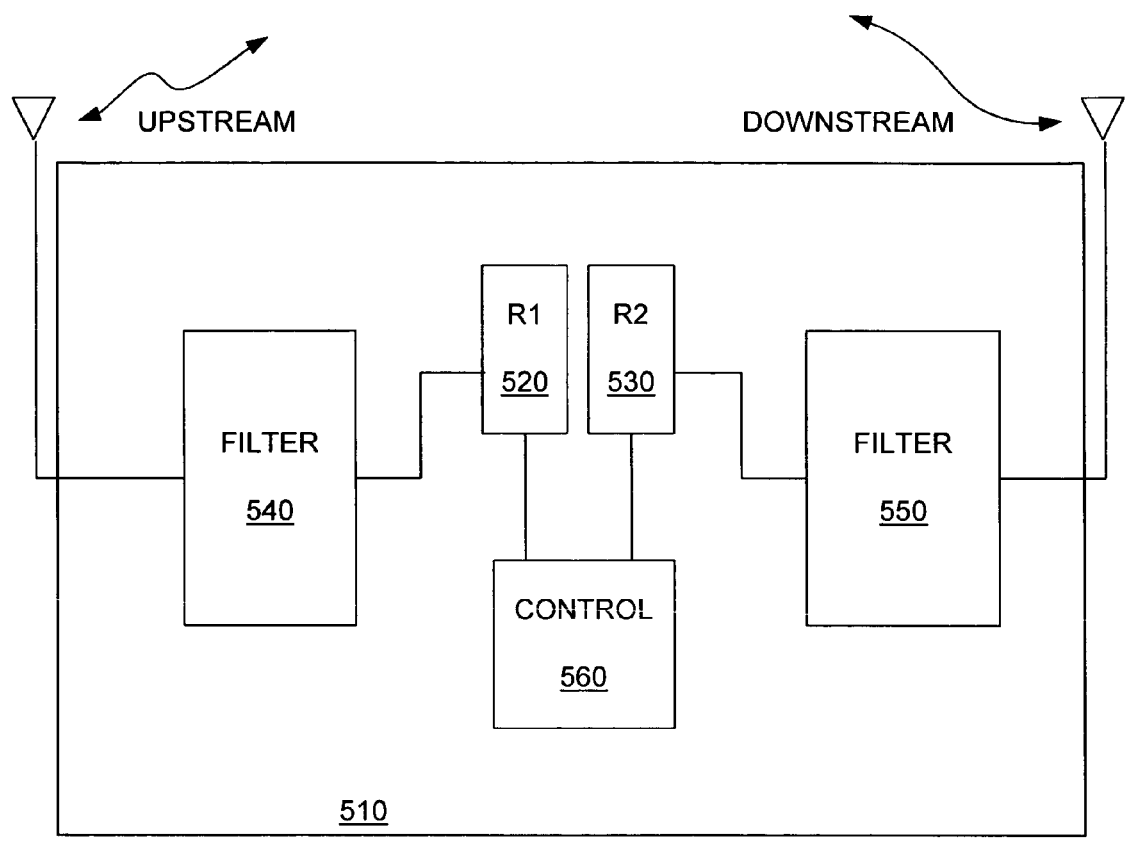
FIG. 5 shows a block diagram of an embodiment of an access node.

FIG. 5 shows a block diagram of an exemplary embodiment of an access node 510 that can be included within the mesh network of FIG. 4. This access node 510 includes a first radio 520 that is in communication with an upstream device (gateway or access node) and a second radio 530 that can communicate with a downstream device (another access node or a client). The radios 520, 530 can be operable on different transmission channels to minimize interference between transmission links of the mesh network. Each radio may include a bank of channel filters 540, 550. A controller 560 can determine which radio is operating on the uplink communication, and which radio is operating on downlink communication. The controller makes data path selections to gateways, and manages control of communication with downstream devices.

Figure 6:
FIG. 6 is a flow chart showing steps included within a method of access point control of client roaming.

FIG. 6 is a flow chart showing steps included within a method of access point control of client roaming. The method includes a first step 610 including the access point monitoring reception of signals from a client with which the access point has had communication, and a second step 620 including the access point transmitting a link status indication to the client if the access point stops receiving signals from the client.

FIG. 7 is a flow chart showing a more specific implementation of the method of FIG. 6. The method includes a first step 710 including the access point periodically transmitting requests to a client, a second step 720 including the access point monitoring reception of responses to the requests, and a third step 730 including the access point transmitting at least one disassociation frame if a response is not received by the access point from the client. As previously mentioned, transmission of the at least one disassociation frame can be suppressed if the access point receives an association response from another access point that is intended for the client. Additionally, the access point can transmit a disassociation frame if a response is received from the client, and a signal quality parameter of the response is below a threshold. The signal quality parameter can include at least one of signal power, SNR, PER and BER.

Figure 8:
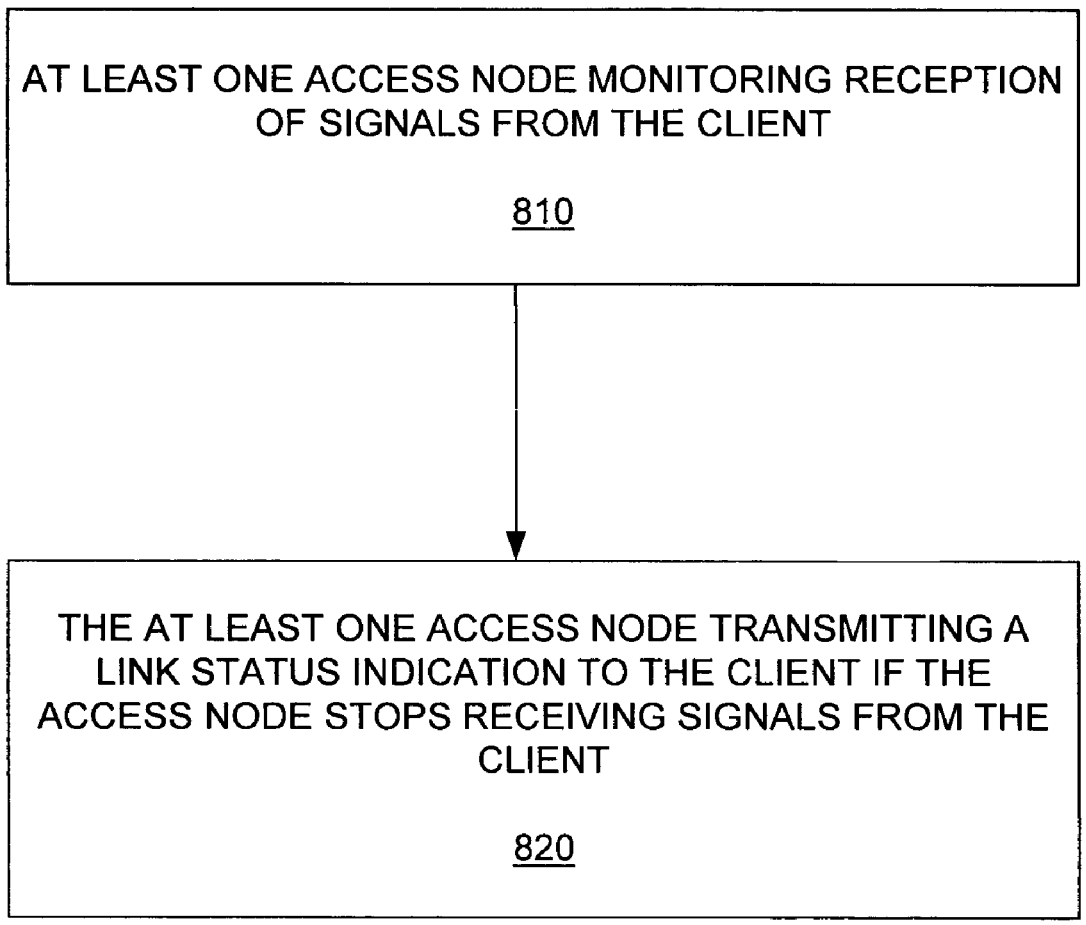
FIG. 8 is a flow chart showing steps included within a method of network control of client roaming in which the network includes a plurality of access nodes and at least one client.

FIG. 8 is a flow chart showing steps included within a method of network control of client roaming in which the network includes a plurality of access nodes and at least one client. The method includes a first step 810 including at least one access node monitoring reception of signals from the client, and second step 820 including the at least one access node transmitting a link status indication to the client if the access node stops receiving signals from the client.

Figure 9:
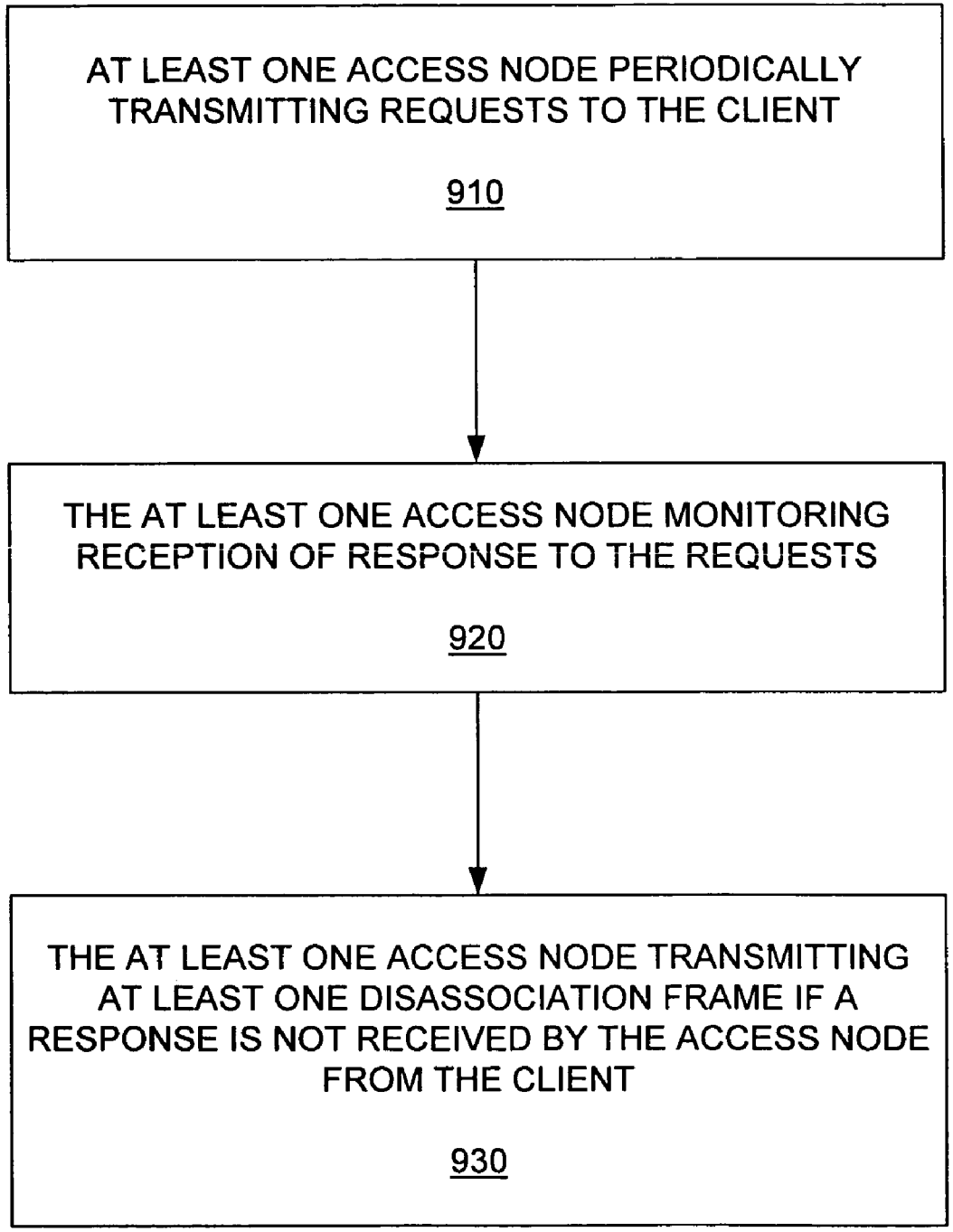
FIG. 9 is a flow chart showing a more specific implementation of the method of FIG. 8.

FIG. 9 is a flow chart showing a more specific implementation of the method of FIG. 8. This method includes a first step 910 including at least one access node periodically transmitting requests to the client, a second step 920 including the at least one access node monitoring reception of response to the requests, and a third step 930 including the at least one access node transmitting at least one disassociation frame if a response is not received by the access node from the client. As previously mentioned, transmission of the at least one disassociation frame can be suppressed if the access point receives an association response from another access point that is intended for the client. Additionally, the access point can transmit a disassociation frame if a response is received from the client, and a signal quality parameter of the response is below a threshold. The signal quality parameter can include at least one of signal power, SNR, PER and BER.

Although specific embodiments of the invention have been described and illustrated, the invention is not to be limited to the specific forms or arrangements of parts so described and illustrated. The invention is limited only by the appended claims.

What is claimed:

1. A method of an access point controlling roaming of a client, comprising:
   the access point monitoring reception of signals from the client with which the access point has had communication;
   if the access point stops receiving the signals from the client and if the access point determines the client is not communicating with another access point, then the access point transmitting a link status indication to the client that indicates the access point is not receiving the signals from the client.

2. The method of claim 1, wherein the access point determining the client is communicating with another access point comprises the access point receiving an association response from another access point that is intended for the client.

3. The method of claim 1, further comprising:
   the access point transmitting the link status indication if a signal quality parameter of signals received from the client is below a threshold.

4. The method of claim 3, wherein the signal quality parameter is at least one of signal power, SNR, PER and BER.

5. The method of claim 1, wherein the access point is a wireless node within a wireless mesh network.

6. The method of claim 5, wherein the access node includes a wireless data path to a gateway that is connected to the wireless mesh network.

7. The method of claim 1, further comprising:
   the access point receiving an association request from a client attempting to connect to the network;
   the access point responding with an association response, in which timing of transmission of the association responses is dependent upon a magnitude of a quality parameter of the received association request of the client.

8. A method of an access point controlling roaming of a client, comprising:
   the access point periodically transmitting requests to a client;

the access point monitoring reception of responses to the requests;

the access point transmitting at least one disassociation frame if responses are not received by the access point from the client and if the access point does not receive an association response from another access point that is intended for the client.

9. The method of claim 8, wherein the requests are ARP requests.

10. The method of claim 8, wherein the responses are ARP responses.

11. The method of claim 8, further comprising:

the access point transmitting a disassociation frame if responses are received from the client, and a signal quality parameter of the responses is below a threshold.

12. The method of claim 11, wherein the signal quality parameter is at least one of signal power, SNR, PER and BER.

13. The method of claim 8, wherein requests and disassociation frames are transmitted according to an 802.11 transmission protocol.

14. A method of network control of client roaming, the network comprising a plurality of access nodes and at least one client, the method comprising:

at least one access node monitoring reception of signals from the client;

the at least one access node transmitting a link status indication to the client if the access node stops receiving signals from the client and the at least one access point determines the client is not communicating with another access point.

15. The method of network control of claim 14, further comprising:

the at least one access node transmitting the link status indicator if a signal quality parameter of signals received by the at least one access node from the client is below a threshold.

16. A method of network control of client roaming, the network comprising a plurality of access nodes and at least one client, the method comprising:

at least one access node periodically transmitting requests to the client;

the at least one access node monitoring reception of responses to the requests; and wherein the at least one access node transmits at least one disassociation frame if a response is not received by the access node from the client, the at least one access node receives an association response from another access node that is intended for the client.

17. The method of network control of claim 16, wherein the requests are ARP requests.

18. The method of network control of claim 16, wherein the responses are ARP responses.

19. The method of network control of claim 16, further comprising:

the at least one access node transmitting the at least one disassociation frame if a response is received from the client, and a signal quality parameter of the response is below a threshold.

20. The method of network control of claim 16, further comprising the client transmitting an association request when attempting to connect to the network, and each access node that receives the association request responding with an association response, in which timing of transmission of the association responses by each of the access nodes is dependent upon a magnitude of a quality parameter of the received association request of the client.

21. The method of network control of claim 16, wherein the client responds to received disassociation frames by transmitting a new association request in an attempt to locate a new access node for connection with the network.

* * * * *